July 3, 1956
L. CURRAN
2,752,909
DIAMOND TOOL HOLDER
Filed Jan. 12, 1953
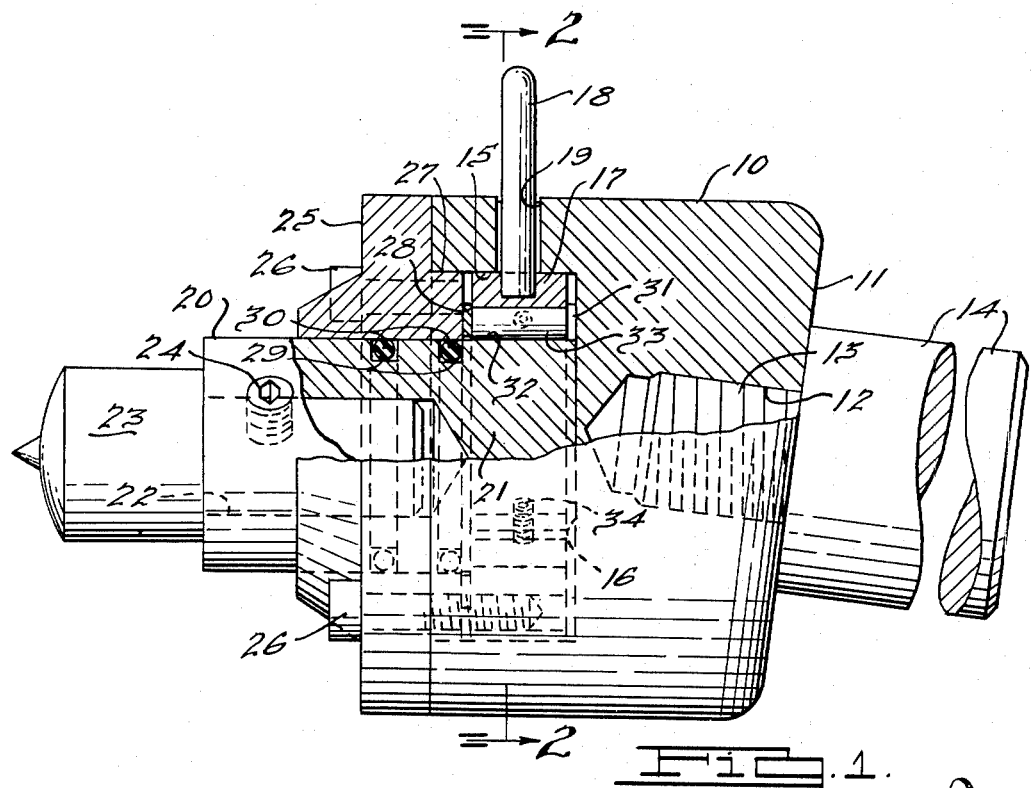
Fig. 1.
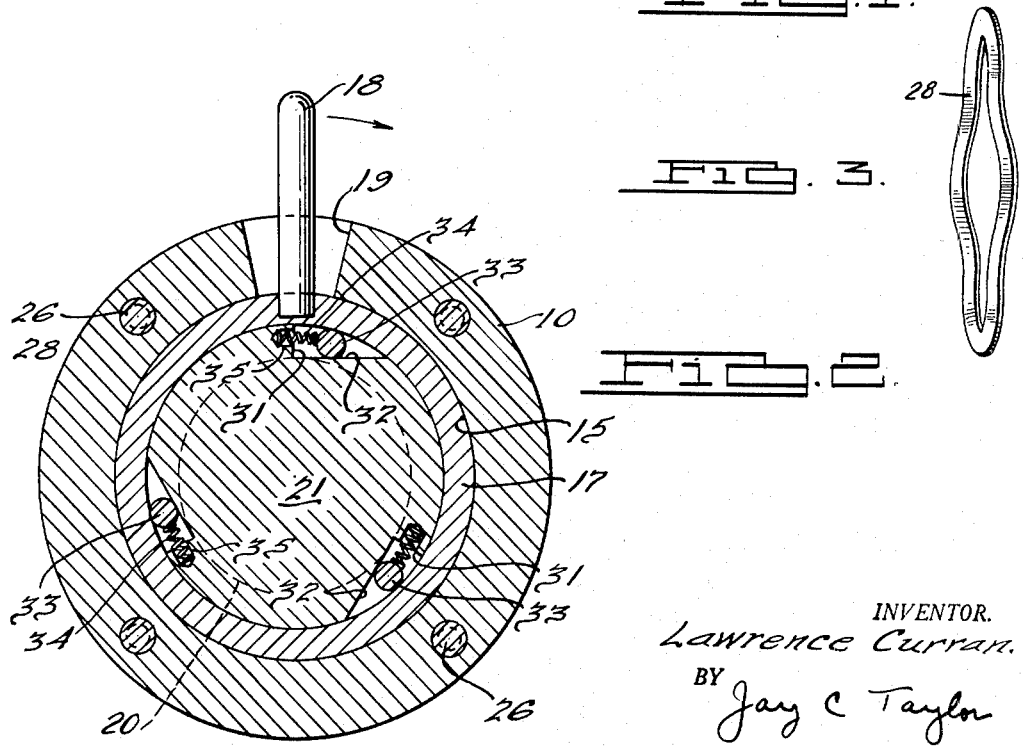
Fig. 3.
Fig. 2.
INVENTOR.
Lawrence Curran.
BY Jay C. Taylor
ATTORNEY.

United States Patent Office 2,752,909
Patented July 3, 1956

2,752,909

DIAMOND TOOL HOLDER

Lawrence Curran, Detroit, Mich.

Application January 12, 1953, Serial No. 330,865

5 Claims. (Cl. 125—39)

This invention relates to a tool holder and more particularly to a manually operable holder for supporting and indexing a diamond tool, such as used for dressing abrasive wheels.

An object of the present invention is to provide a simple, economical, yet highly efficient and improved holder for a diamond dressing tool, whereby the tool is firmly supported in a mounting which allows a minute resilient yielding of the tool to protect the same from vibratory impacts from the abrasive wheel being dressed and which readily affords manual indexing of the tool as required between successive dressing operations.

Other objects of this invention will appear in the following description and appended claims, reference being had to the accompanying drawings forming a part of this specification wherein like reference characters designate corresponding parts in the several views.

Figure 1 is a fragmentary side elevation of the present invention with portions broken away to show details of construction.

Figure 2 is a vertical transverse section taken in the direction of the arrows along the line 2—2 of Figure 1.

Fig. 3 is a perspective view substantially from one side and slightly from the front of the spring-type washer employed to retain the tool holder snugly against the body, the washer being shown in uncompressed condition and removed from the holder.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A particular embodiment of the present invention is illustrated by way of example in the drawings wherein an outer cylindrical body 10 is shown having a rear end surface 11 inclined at an approximate 15° angle to the axis of the body 10. An internally threaded rear bore 12 extends into the body 10 perpendicularly to the surface 11 and contains the threaded spindle 13 of an enlarged coaxial integral supporting shank 14. Thus the latter is firmly secured to the body 10 with the forward shoulder of the shank 14 at the base of the spindle 13 solidly abutting the surface 11 and with the cylindrical axes of the body 10 and shank 14 intersecting at an approximate 15° angle. By the foregoing structure, the shank 14 is adapted to be secured in a conventional support and to hold the diamond dressing tools at a desired angle with respect to the abrasive wheel being dressed without further modification of the tool holder or supporting means therefor.

Opening at the forward end of the body 10 is a coaxial cylindrical chamber 15 having a base wall or surface 16 perpendicular to the axis of the body 10. Rotatably supported within the chamber 15 is an indexing member or ring 17 having its outer circumferential surface fitting closely to the inner circumferential wall of the chamber 15. The ring 17 is rotatably shifted in an indexing movement by means of a radial lever 18 extending through a movement limiting slot 19 in the circumferential sidewall of the chamber 15 and having an inner end suitably connected to the ring 17, as for example by the screw connection shown.

A rotatable tool holder 20 coaxial with the body 10 projects forward therefrom and is provided with an enlarged cylindrical head or inner portion 21 closely fitting within the ring 17 and rotatable independently thereof. The forward end of the holder 20 is provided with a socket 22 within which a diamond dressing tool 23 is removably secured by a set screw 24 which screws radially through the sidewall of the holder 20 into the chamber 22 and frictionally engages the inserted portion of the tool 23.

An annular nose collar or face plate 25 is removably secured to the forward end of the body 10 by a plurality of screws 26 and fits closely around the holder 20. An integral inner portion 27 of the plate 25 projects into the chamber 15 toward the ring 17 and head 21 and is spaced axially from the latter by a spring-type washer 28 under axial compression between the portions 21 and 27. The washer 28 preferably comprises a resilient metal suitably cupped or crenelated axially so as to resist axial deformation resiliently upon tightening of the screws or bolts 26. In the assembled position with the screws 26 tightened, the rear end of the head 21 is firmly seated flush against the surface 16 so as to position the holder 20 positively with respect to the body 10 in predetermined alignment therewith. In this regard, the surface 16 and confronting rear end surface of the head 21 are accurately finished with respect to the axes of the holder 20 and the body 10 and are both preferably at right angles thereto. The axially resilient washer 28 not only yieldingly resists axial play or movement of the holder 20 and yieldingly holds the latter firmly against the surface 16 in predetermined alignment with the body 10, but also yieldingly binds the head 21 frictionally against rotational movement independently of the body 10 and the ring 17.

Forward of the head 21, the reduced body or shank of the holder 20 is provided with a pair of annular seats 29, each dimensioned to contain an O-ring 30 of rubber or rubber-like material under radial compression between the confronting circumferential portions of the holder 20 and annular plate 25. The O-rings 30 resiliently oppose radial play of the holder 20 and cooperate with the spring washer 28 to resist rotational movement of the holder 20 independently of the body 10 and ring 17. Accordingly the holder is firmly supported and unavoidable mechanical play between the holder and its supporting means is resiliently cushioned to effect absorption of minute impacts imparted to the diamond tool 23 during dressing operations. In consequence, undue wear of the diamond is avoided and its useful life prolonged.

In order to permit manual indexing of the holder 20 so as to expose an unworn surface of the diamond in the dressing operation, a suitable friction clutch is employed between the ring 17 and head 21, whereby the ring 17 is rotatable in one direction independently of the head 21 and is rotatable in unison therewith in the opposite direction. In the present instance, three uniformly spaced segmental notches are formed in the circumference of the head 21, each notch being bounded by a radial shoulder 31 in an axial plane and by a roller engaging surface 32 also in an axial plane perpendicular to the shoulder 31. Thus the several surfaces 31 and 32 in cooperation with the inner circumference of the indexing ring 17 comprise three roller seating pockets, each tapering in the same circumferential direction. A cylindrical roller 33 having a diameter slightly less than the radial length of the associated surface 31 is provided within each pocket and is yieldingly urged toward the small end of the pocket by a spring 34 retained at one end within a socket 35 formed in the surface 31.

By this construction, each roller 33 is urged circumferentially in the direction of convergence of the associated surface 32 and inner circumference of the ring 17 into rolling engagement therewith. Upon counterclockwise"

shifting of the lever 18 in Figure 2, the rollers 33 are rolled toward the larger ends of their respective pockets, permitting the ring 17 to rotate independently of the head 21, which latter is frictionally bound against rotation by the cooperating action of the rings 30 and 28. However, upon clockwise shifting of the lever 18, the rollers 33 are rolled toward the tapered end of their respective pockets so as to frictionally engage their respective surfaces 32 and rotate the head 21 clockwise in unison with the ring 17. In consequence, the holder 20 is manually indexed as desired in accordance with the limited movement afforded to the handle 18 within the slot 19.

I claim:

1. In a manually operable device for indexably supporting a diamond dressing tool, a body having a cylindrical chamber opening axially at one end, the other end of said chamber comprising an abutment wall of said body perpendicular to the axis of said chamber, means on said body for rigidly securing the same to a support, a rotatable annular indexing member having its outer peripheral surface in bearing contact with the cylindrical surface of said chamber and supported thereby, a rotatable tool holder having a cylindrical shaft of smaller diameter than the inner peripheral surface of said annular member and coaxial therewith, said shaft terminating in an enlarged cylindrical head flushly abutting said abutment wall endwise, the cylindrical surface of said head being in bearing contact with said inner peripheral surface and supported thereby, collar means secured to said body around said shaft in supporting and bearing contact therewith and having a portion retaining said enlarged head snugly against said abutment wall, clutch means operatively connecting said member and head to rotate the latter in one direction upon rotation of said member in said one direction, means frictionally binding said holder against rotation upon rotation of said member oppositely to said one direction, and a lever connected to said member to rotate the same and extending radially outward therefrom through a movement limiting slot in said body.

2. The combination according to claim 1 wherein said portion of said collar means extends around said shaft and into said chamber toward said enlarged head.

3. In a manually operable device for indexably supporting a diamond dressing tool, a body having a cylindrical chamber opening axially at one end, the other end of said chamber comprising an abutment wall of said body perpendicular to the axis of said chamber, means on said body for rigidly securing the same to a support, a rotatable annular indexing member having its outer peripheral surface in bearing contact with the cylindrical surface of said chamber and supported thereby, a rotatable tool holder having a cylindrical shaft of smaller diameter than the inner peripheral surface of said annular member and coaxial therewith, said shaft terminating in an enlarged cylindrical head flushly abutting said abutment wall endwise, the cylindrical surface of said head being in bearing contact with said inner peripheral surface and supported thereby, collar means fixed against axial movement with respect to said body and extending around said shaft in supporting and bearing contact therewith, a portion of said collar means retaining said enlarged head snugly against said abutment wall, clutch means operatively connecting said member and head to rotate the latter in one direction upon rotation of said member in said one direction, said body having a circumferentially extending movement limiting slot therethrough adjacent said member, an operating lever extending radially inwardly through said slot and engaging said member to rotate the same, and a radially resilient annular cushioning element interposed between said holder shaft and collar under radial compression to engage the latter frictionally and to absorb impacts transmitted to said holder.

4. In a manually operable device for indexably supporting a diamond dressing tool, a body having a cylindrical chamber opening axially at one end, the other end of said chamber comprising an abutment wall of said body perpendicular to the axis of said chamber, means on said body for rigidly securing the same to a support, a rotatable annular indexing member having its outer peripheral surface in bearing contact with the cylindrical surface of said chamber and supported thereby, a rotatable tool holder having a cylindrical shaft of smaller diameter than the inner peripheral surface of said annular member and coaxial therewith, said shaft terminating in an enlarged cylindrical head flushly abutting said abutment wall endwise, the cylindrical surface of said head being in bearing contact with said inner peripheral surface and supported thereby, a collar extending around said shaft in supporting and bearing contact therewith and secured to said body coaxially with said chamber at said one end, said collar having an annular projection extending into said chamber around said shaft and toward said enlarged head in axially blocking relation, clutch means operatively connecting said member and head to rotate the latter in one direction upon rotation of said member in said one direction, said body having a circumferentially extending movement limiting slot therethrough, a lever extending radially outward through said slot from said member and connected thereto for rotating the same, a ring of resilient material seated under radial compression between said collar and holder shaft to engage the collar frictionally and to absorb impacts transmitted to the shaft, and a resilient ring seated under axial compression between said annular projection and head to urge the latter flushly against said abutment wall.

5. In a manually operable device for indexably supporting a diamond dressing tool, a body having a cylindrical chamber opening axially at one end, the other end of said chamber comprising an abutment wall of said body perpendicular to the axis of said chamber, a rotatable annular indexing member having its outer peripheral surface in bearing contact with the cylindrical surface of said chamber and supported thereby, a rotatable tool holder having a cylindrical shaft of smaller diameter than the inner peripheral surface of said annular member and coaxial therewith, said shaft terminating in an enlarged cylindrical head flushly abutting said abutment wall endwise, the cylindrical surface of said head being in bearing contact with said inner peripheral surface and supported thereby, a collar extending around said shaft in supporting and bearing contact therewith and secured to said body coaxially with said chamber at said one end, said collar having an annular projection extending into said chamber around said shaft and toward said enlarged head in axially blocking relation, one-way means of clutch connection between said member and head for transmitting to said head rotary movement of said member in only one direction thereof, the portion of said body overlying said member having a circumferentially extending movement limiting slot therethrough, a lever extending radially outward through said slot from said member and connected thereto for rotating the same, a ring of radially compressible material seated around said holder shaft under radial compression between the latter and said collar to engage the latter frictionally and to absorb impacts transmitted to said shaft, and an axially compressible ring seated around said shaft under axial compression between said annular projection and head to urge the latter flushly against said abutment wall.

References Cited in the file of this patent

UNITED STATES PATENTS

| | | |
|---|---|---|
| 431,855 | Simpson | July 8, 1890 |
| 2,333,939 | Kreimborg | Nov. 9, 1943 |
| 2,466,199 | Berthiez | Apr. 5, 1949 |
| 2,505,684 | McClernon | Apr. 25, 1950 |
| 2,628,608 | Loecy | Feb. 17, 1953 |
| 2,629,368 | Bruce | Feb. 24, 1953 |
| 2,644,442 | Loecy | July 7, 1953 |